United States Patent
Monaghan

[11] 3,888,329
[45] June 10, 1975

[54] VEHICLE SAFETY DEVICE

[76] Inventor: James Monaghan, 11849 Clifton Blvd., Apt. 204A, Lakewood, Ohio 44107

[22] Filed: May 14, 1973

[21] Appl. No.: 360,345

Related U.S. Application Data

[63] Continuation-in-part of Ser. No. 250,413, May 4, 1972, Pat. No. 3,759,343, which is a continuation-in-part of Ser. No. 163,379, July 16, 1971, Pat. No. 3,741,330, said Ser. No. 250,413, is a continuation-in-part of Ser. No. 163,379.

[52] U.S. Cl. ...... 180/103; 280/150 B; 280/150 AB; 297/390
[51] Int. Cl. .......................................... B60r 21/08
[58] Field of Search......... 280/150 B; 297/384, 390, 297/216, 150, 144, 145, 146; 312/266, 268; 180/103

[56] References Cited
UNITED STATES PATENTS

| 580,976 | 4/1897 | Henry | 297/240 |
|---|---|---|---|
| 2,635,678 | 4/1953 | Basil | 297/146 |
| 2,650,835 | 9/1953 | Gonsett | 280/150 B |
| 3,105,702 | 10/1963 | Larson | 280/150 B |
| 3,524,678 | 8/1970 | De Lauenne | 297/216 |
| 3,633,936 | 1/1972 | Huber | 280/150 B |
| 3,640,572 | 2/1972 | Doehler | 280/150 B |
| 3,650,542 | 3/1972 | Shimano et al. | 280/150 B |
| 3,715,130 | 2/1973 | Harada et al. | 280/150 B |
| 3,743,317 | 7/1963 | Flajole | 280/150 B |

FOREIGN PATENTS OR APPLICATIONS

| 1,563,629 | 3/1969 | France | 280/150 B |
|---|---|---|---|
| 1,074,992 | 2/1960 | Germany | 280/150 B |
| 1,008,155 | 3/1952 | France | 280/150 B |
| 264,159 | 12/1964 | Australia | 280/150 B |
| 1,171,770 | 11/1969 | United Kingdom | 280/150 B |

*Primary Examiner*—David Schonberg
*Assistant Examiner*—John P. Silverstrim
*Attorney, Agent, or Firm*—Teare, Teare & Sammon

[57] ABSTRACT

The disclosure relates to a vehicle occupant restraint device, particularly a passenger restraint device. The device comprises a resilient pad for restraining the passenger, a rigid transverse crossmember, an upright rotatable arm, a transverse pivot shaft and an orientation maintenance means operably coacting between the transverse pivot shaft and the crossmember which preserves the orientation of the pad throughout its operating movement. The device also may include spring means for urging the device into a storage position.

The device may also include an automatic operation system for positively restraining the passenger upon the occurrence of a vehicle accident event to provide an automatic passive restraint.

19 Claims, 18 Drawing Figures

VEHICLE SAFETY DEVICE

CROSS REFERENCE TO RELATED APPLICATIONS

The present application is a continuation-in-part of U.S. patent application, Ser. No. 250,413, of James Monaghan, filed May 4, 1972 now U.S. Pat. No. 3,759,343, which is a continuation-in-part of U.S. patent application, Ser. No. 163,379 of James Monaghan, filed July 16, 1971 now U.S. Pat. No. 3,741,330. The present application is also a continuation-in-part of U.S. patent application Ser. No. 163,379.

BACKGROUND OF THE INVENTION

The present invention relates to a vehicle occupant safety device, particularly to a restraint device for an occupant, such as a passenger.

Previous occupant restraining devices have usually comprised fabric safety belts which passed across a portion of the occupant's body and secured to hold the occupant in place. Once secured, these belts confined the occupant and prevented him from moving within the vehicle if he desired. In order to move within the vehicle, such as reaching for the glove compartment or for change in a pocket, the belt had to be released and was, therefore, inconvenient and potentially unsafe. In the event of an accident, the belt might jam and entrap the occupant inside the vehicle. In addition, the belt, while not in use, tended to get tangled or trapped in the seats or to drag on the floor. A physically handicapped occupant with an impaired arm or hand had difficulty in securing the belt.

Other restraining devices, which were adapted for automatic operation, were complex and required rearrangement or replacement of critical parts after each accident event, thereby being expensive to maintain and inoperable if successive accident events occurred.

The following patents discuss examples of prior art structures:

| U.S. Pat. No. | ISSUED TO | ISSUE DATE |
|---|---|---|
| 2,805,081 | Frimet | September 3, 1957 |
| 3,129,017 | Graham | April 14, 1964 |
| 3,633,936 | Huber | January 11, 1972 |
| 3,640,572 | Doehler | February 8, 1972 |
| 3,650,542 | Shimano et al | March 21, 1972; and |
| Australian Pat. Specification No. 264,159 to Marik published December 17, 1964. | | |

SUMMARY OF THE INVENTION

The vehicle occupant restraint device of the present invention comprises a resilient restraint pad for restraining the occupant, a rigid transverse crossmember, an upright rotatable arm, a transverse pivot shaft and an orientation maintenance means operably coacting between the transverse pivot shaft and the crossmember for preserving the orientation of the pad throughout its operating movement. The device may also include spring means for urging the device into a storage position. In addition, the device may also include an automatic operation system for positively restraining the passenger upon the occurrence of a vehicle accident event to provide an automatic passive restraint.

It is an object of the present invention to protect a vehicle occupant, especially a vehicle passenger, with a restraint device of optimum size and positioning and of sturdy and simple construction, thereby providing reliable protection at low cost.

It is an object of the present invention to provide a restraint device which can be readily adapted for manual operation, fully automatic operation or a combination of both.

It is an object of the automatic operation embodiments to provide a fully automatic, passive restraint for protecting the vehicle occupant by rapidly and automatically restraining him upon the occurrence of a vehicle accident event. It is a still further object of these automatic operation embodiments to provide a restraint device which is both automatic and completely reusable so that the device may be used repeatedly for several accident events and so that it remains effective during a vehicle accident in which there are successive vehicle accident events, such as multiple collisions. It is an object of this embodiment to provide means for automatically extending the period of occupant restraint during multiple accident events, such as a collision from the front and then the side, so that the restraint was not terminated before danger ceased.

DESCRIPTION OF THE PREFERRED EMBODIMENTS

Figure 1:
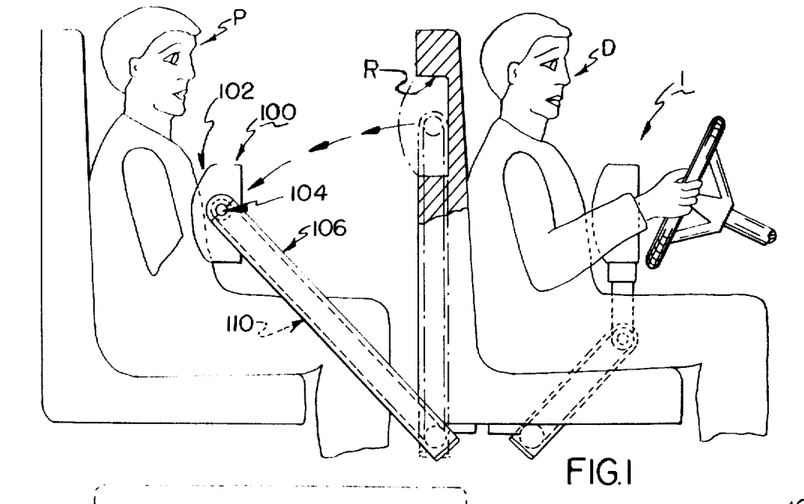
FIG. 1 is a side elevation view, partially cut-away and partially in section, illustrating a restraint device 100 of the present invention installed in a vehicle for restraining a passenger P and a restraint device 1 for restraining a driver D (shown for comparison)

The preferred embodiment of the restraint device 100 of the present invention is illustrated in FIGS. 1 to 10 and is particularly adapted for protectively restraining a vehicle occupant, especially a vehicle passenger. The device 100 provides a fully automatic, reusable passive restraint embodiment for accomplishing this restraint. Basically, and as may be seen in FIGS. 1 and 2, the device 100 comprises a resilient restraint pad 102, a pad-supporting crossmember 104, a generally upright, rotatable support arm 106, a transversely extending pivot shaft 108 and an orientation maintenance means 110 operably coacting between the transverse pivot shaft 108 and the crossmember 104 which preserves the orientation of the pad 102 throughout its operating movement. In this fully automatic, passive restraint embodiment, the device 100 also includes an automatic operation system 200 (diagrammatically illustrated in FIG. 10) which comprises a sensing means 202 for sensing the occurrence of a vehicle accident event, power means 204 for moving the restraint pad 102 into contacting and restraining engagement with the passenger and an actuation means 206 for actuating the power means 204 upon the sensing of an accident event by the sensing means 202. For the purposes of comparison, a restraint device 1 which is particularly suited for restraining a vehicle driver (and which is disclosed in my prior U.S. patent application Ser. No. 163,379 filed July 16, 1971) is also illustrated in FIG. 1.

During normal operation of the vehicle, the restraint device 100 of the present invention is stored out of the passenger's way in an upright position (dot-dashed line showing of FIG. 1) in a recess R in a transverse panel of the vehicle. Upon the occurrence of a vehicle accident event, the automatic operation system 200 (FIG. 10) rotates the support arm 106 rearwardly and the pad 102 moves into restraining engagement with the passenger P, thereby protectively restraining him. Throughout the rearward travel of the arm 106 and its associated pad 102, the pad 102 is maintained in a predetermined orientation by the orientation means 110 so that the pad 102 contacts and restrains the passenger P in an optimum orientation.

Figure 2:
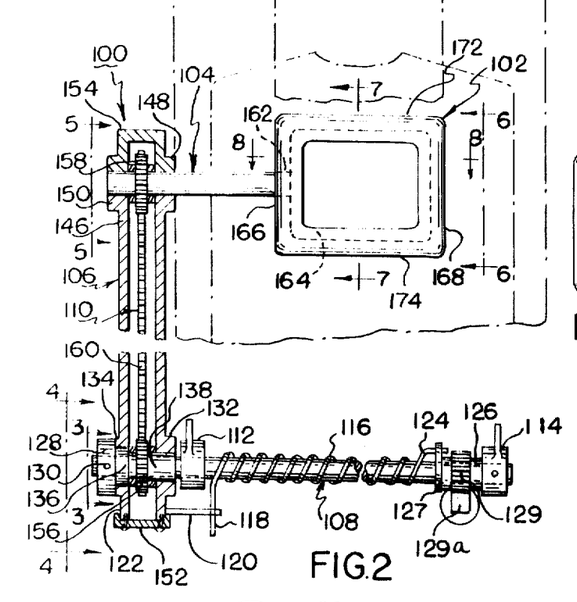
FIG. 2 is a front elevation view, partially broken and partially in section, illustrating the restraint device 100 of FIG. 1.
Figure 3:
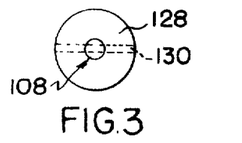
FIG. 3 is a side elevation view taken along the line 3—3 of FIG. 2.

In this embodiment of the restraint device 100, the pivot shaft 108 is stationary with respect to the rest of the device 100 and is the means by which the device is mounted to the vehicle. Preferably, the mounting is effected by a pair of spaced stationary mounting collars or brackets 112 and 114 which are attached to the shaft 108 by suitable lock pins (FIG. 2). Collar 112 is attached adjacent the end of the shaft 108 where the arm 106 is mounted while collar 114 is attached to the remote end of the shaft 108.

The shaft 108 extends transversely of the vehicle and is journaled at one end to permit rotational mounting of the support arm 106 to provide a transverse pivot axis for the rotation of the arm 106.

Figure 4:
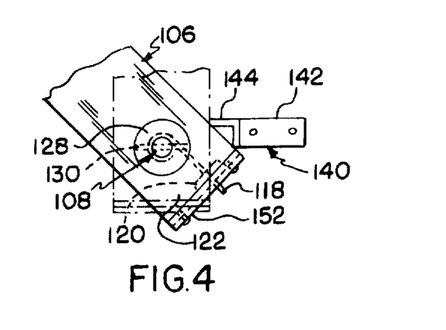
FIG. 4 is a side elevation view taken along the line 4—4 of FIG. 2.

A helical torsion spring 116 circumferentially encompasses the shaft 108 and extends lengthwise of it (FIG. 2). The torsion spring 116 biases and urges the rotatable arm 106 forwardly so that the arm 106 will tend to rotate forwardly into the upright, stored position when it is free to rotate. This forward biasing retains the device 100 in the stored position out of the passenger's way during normal operation of the vehicle without the need for a separate locking device. One end 118 of the torsion spring 116 engages an arm 120 extending transversely from the lower end 122 of the rotatable arm 106. The spring end 118 passes through an aperture in the arm 120 so that it abuttingly engages the arm 120 when it rotates either forwardly or rearwardly (FIG. 4). This dual abutment permits the torsion spring 116 to provide the aforesaid forward biasing and also a rearward biasing when the automatic system 200 is actuated upon the occurrence of a vehicle accident event. The opposite end 124 of the torsion spring 116 is attached to a rotatable collar 126 which is mounted on the pivot shaft 108 and which will be discussed later in connection with the automatic operation system 200. If desired, the torsion spring 116 may be provided with a tubular cover which encompasses both the spring 116 and the portion of the shaft 108 which the spring 116 encompasses.

The rotatable arm 106 is rotatably attached at its lower end 122 to the transverse pivot shaft 108 so that it will rotate in a vertical plane which extends longitudinally of the vehicle and also perpendicularly to the general plane of the passenger's torso. Preferably, as shown in FIG. 1, it is mounted on the inner end of the transverse pivot shaft 108 adjacent the central portion of the vehicle. This conveniently clears the rotatable pad support of the driver's restraint device 1 which is close to the door. Preferably, the arm 106 is secured to the shaft 108 by an annular collar 128 and a lock pin 130 (FIGS. 2, 3, 4 and 9) which are affixed to the pivot shaft 108. The transverse positioning of the arm 106 on the shaft 108 is effected by the same collar 128 and the mounting collar 112.

The rotatable arm 106 is provided with inner and outer circular bosses, 132 and 134 respectively, which are internally journaled for rotation on internal extensions 136 and 138 of the collar 128 (FIGS. 2 and 9) and which act as bearings for the arm 106. Both bosses 132 and 134 coact with collars 112 and 128, respectively, to transversely position the arm 106 on the shaft 108. An inner, slotted, reduced diameter, internal extension 138 of collar 128 permits the shaft 108 to mount the orientation means 110. An outer enlarged diameter, internal extension 136 of collar 128 prevents outward transverse shifting of the orientation means 110.

If desired, the rearward rotation of the rotatable arm 106 may be confined to a limited angle, such as 45°, by a front stop 140 (FIG. 4). In the form shown, the front stop 140 is rigid and comprises a longitudinal support bracket 142 and an L-shaped stop bracket 144 which extends transversely of it and limits the rearward rotation of the support arm 106 by abuttingly engaging the lower side 122 of the arm 106. This front stop 140 is oriented so that the rotatable arm 106 can be rearwardly depressed about 45° from the vertical.

Figures 5, 6, 7, 8:
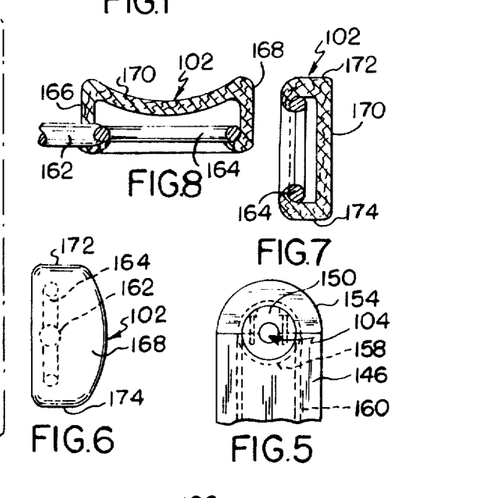
FIG. 5 is a side elevation view taken along the line 5—5 of FIG. 2.
FIG. 6 is a side elevation view taken along the line 6—6 of FIG. 2.
FIG. 7 is a side elevation view, in section, taken along the line 7—7 of FIG. 2.
FIG. 8 is a top plan view, partially cut away and partially in section, taken along the line 8—8 of FIG. 2.

The upper end 146 of the pivoted arm 106 is provided with inner and outer integral bosses 148 and 150, respectively, which are internally journaled for the rotation of the crossmember 104. This crossmember 104, in turn, mounts the pad 102 to the rotatable arm 106. While this crossmember 104 is cylindrical and is free to rotate on the rotatable arm 106, its orientation is fixed by the orientation means 110. The orientation means 110 coacts between this upper crossmember 104 and the lower transverse pivot shaft 108. In the form shown, this means 110 is housed within the rotatable arm 106 for convenience and safety. Accordingly, the arm 106 is hollow, or tubular, with an access plate 152 bolted to its lower end 122 and a journaled, convex access cover 154 bolted on its upper end 146. As shown, the upper access cover 154 is tapbolted through the integral bosses 148 and 150 to the rotatable arm 106 (FIG. 5). This construction safely and effectively encloses an orientation maintenance means 110 while still providing easy service access. Preferably, the arm 120 which attaches the torsion spring 116 to the rotatable arm 106 is attached to and extends transversely out from the lower access plate 152 so that the spring 116 can be detached from arm 106 by removing the plate 152.

Figure 9:
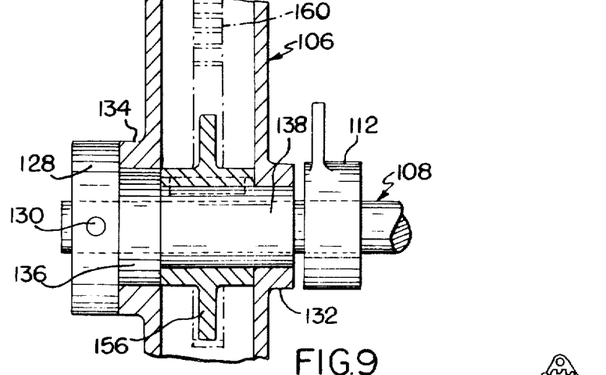
FIG. 9 is an enlarged, fragmentary front elevation view, partially cut away and partially in section, illustrating a lower portion of the restraint device 100 of FIG. 1.

In the form shown, the vertical orientation maintenance means 110 is a planetary action chain and sprocket drive which comprises a lower sprocket 156, an upper sprocket 158 and an interconnecting chain 160 (FIGS. 2, 5 and 9). The lower sprocket 156 is rigidly fixed against rotation by a square key which fits into a slot on the reduced diameter, internal extension 138 and one on the sprocket itself. The upper sprocket 158 has a similar slot and key arrangement for mounting the upper sprocket 158 on the crossmember 104 and fixing it against rotation. Preferably, the upper and lower sprockets 156 and 158 are of equal diameter so that as the arm 106 is angularly deflected with respect to the transverse shaft 108 (and its associated lower sprocket 156), the crossmember 104 (and its associated upper sprocket 158) is angularly deflected an equal amount in the opposite direction thereby maintaining the predetermined orientation of the pad 102 which is mounted on the crossmember 104. Preferably, the pad 102 is vertically oriented. It should be understood that other parallel action mechanisms, such as parallelogram connections, known in the art, may also be used so that the predetermined orientation of the pad 102 is preserved throughout its operating movement.

The pad support crossmember 104 serves both as the mounting for the restraint pad 102 and as the coupling for joining the pad 102 to the orientation means 110. Preferably, the crossmember 104 comprises a solid cylindrical shaft which is externally journaled for rotation with the inner and outer bosses 148 and 150, respectively, of the arm 106. The crossmember 104 is positioned to extend generally transversely of the vehicle along a line generally parallel to the general plane of the passenger's torso and to extend generally perpendicularly to the arm 106. This permits the crossmember 104 to act as a transversely extending pivot and for the crossmember 104 and its associated restraint pad 102 to rotate about a transverse axis in response to the orientation means 110. The free end 162 of the crossmember is joined to a reinforcement ring 164 in the restraint pad 102 as part of a light weight, high quality drop forging (FIGS. 2, 6 and 8).

The restraint pad 102 should be sufficiently resilient to present a comfortable contacting surface to the passenger P while being sufficiently rigid to restrain the passenger in his seat against injury. This is accomplished by constructing the pad 102 itself of a resilient material, such as a foam rubber, and embedding the reinforcement ring 164 within it. In front elevation, the pad 102 has a generally rectangular peripheral outline with rounded corners to eliminate potentially hazardous sharp corners. The reinforcement ring 164 has the same general outline and is disposed within the peripheral outline of the pad 102 to protect the passenger P. The pad 102 has two generally planar, parallel-spaced, side walls 166 and 168 (FIGS. 2, 6 and 8). The rear wall 170 has the configuration of a vertically-oriented cylinder segment so that it is concave in top plan view, or in top sectional view, such as FIG. 8, and rectilinear in side cross section (FIG. 7). The rear wall is spaced from the ring 164. The rear wall is spaced from the ring 164. The top and bottom walls 172 and 174 form interconnecting webs. This configuration provides side wings (side walls 166 and 168) on the pad 102 which restrain the passenger P against sideward movement. The proximal, cylindrical, recessed surface of the rear wall 170 may be fitted with an accident event-actuated, inflatable air cushion to further consider the passenger P in an accident event and further protect him. The air cushion is preferably automatically inflated by the automatic system 200. Also, if desired, a pivoted tray may be attached to the distal side of the pad 102 and held in a horizontal position by spring detents or other suitable holding devices for use at road stops.

Figure 10:
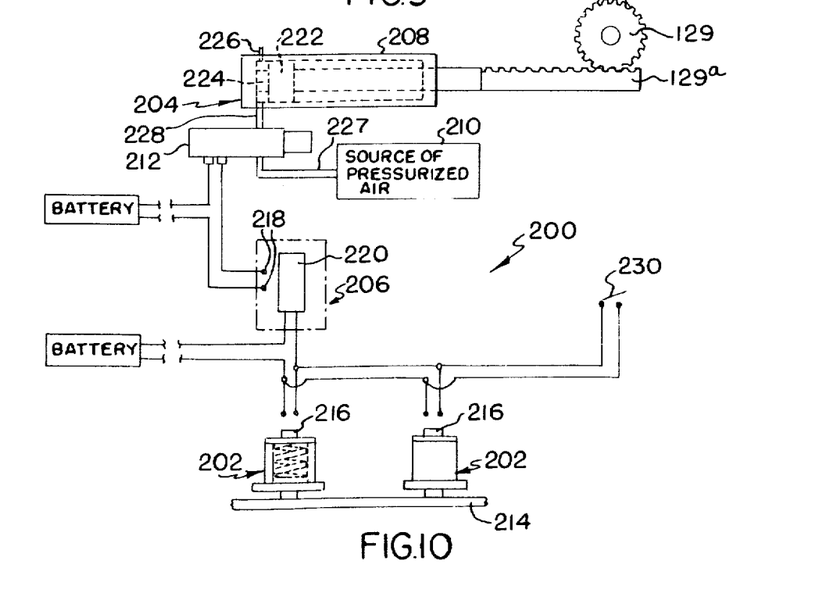
FIG. 10 is a diagrammatic representation of the automatic passive restraint system of the restraint device 100 of the present invention.
Figure 11:
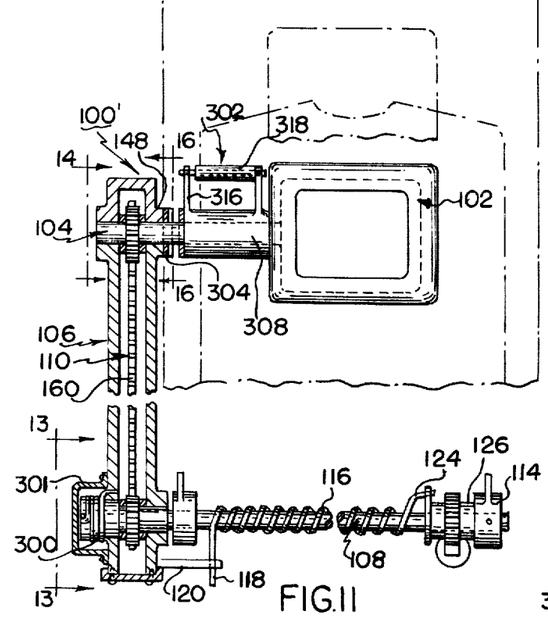
FIG. 11 is a front elevation view, partially broken and partially in section, illustrating a modified embodiment 100' of the restraint device of FIG. 1.
Figure 12:
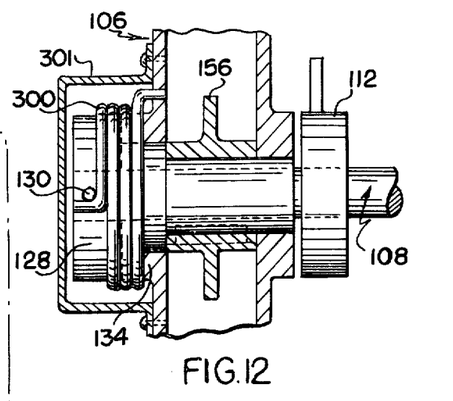
FIG. 12 is an enlarged, fragmentary front elevation view, partially cut away and partially in section, illustrating a lower portion of the restraint device 100' of FIG. 11.

FIG. 10 illustrates the automatic restraint system 200 which senses the occurrence of an accident event to the vehicle and moves the pad 102 inwardly into restraining engagement with the passenger P.

In this embodiment, the torsion spring end 124 is attached to an end plate or arm 127 mounted on the interior end of the rotatable sleeve 126. This sleeve 126 is rotatable on the shaft 108 so that the torsion of spring 116 can be reversed and then increased. The reversed and increased torsion is effected by a gear 128 mounted on the sleeve 126 being driven by a rack 129a powered by pneumatic cylinder 208. On actuation of the pneumatic cylinder 208, the rack 129a drives the gear 129, thereby rotating the sleeve and reversing and increasing the torsion on the spring 116. The increased tension, in turn, increases the rearward force on the rotatable arm 106 and its associated restraint pad 102. By this arrangement, the pad 102 moves rearwardly into contact with the passenger P, then the rearward force of the restraint pad 102 gradually increases as the rack 129a travels through its throw and the ultimate force of the pad 102 against the passenger P can be predetermined.

The cylinder 208 is actuated upon the sensing of a vehicle impact event, such as an accident impact, by the electromechanical portion of the system 200.

In the form shown, this portion of the system comprises at least one robust impact sensor 202, an actuation switch 206 for actuating the cylinder 208, a source of pressurized air 210, a solenoid vlave 212 for connecting the air source 210 to the cylinder 208 on actuation by switch 206, and the vehicle battery for supplying electrical energy to the appropriate foregoing components.

As shown, each sensor 202 is of robust construction and comprises a shield 214 which protects the sensor against accidental actuation, and a press fit or spring biased plunger 216 which closes a pair of switching contacts when pushed in. The force of an accident impact would crush or dent the shield 214 and push in the plunger 216. Preferably, a plurality of sensors 202 are disposed on the vehicle's periphery and wired in parallel so that an impact from the front, side, or rear would actuate the system 200. It should be understood that while impact sensors have been discussed, other appropriate sensing devices, such as proximity sensors, deceleration sensors or distance sensing, electronic sensors could be used. A deceleration sensor may be provided in order to protect the passenger during rapid deceleration, such as panic stops in which ther is no collision or impact. Distance sensing, electronic sensors, such as sonar, laser beam, or radar sensors, may be provided on the front of the vehicle to actuate the system 200 when a distant object is sensed, thereby giving greater security. A single, variable range, electronic sensor, mounted on the front of the car, could be used and the range could be varied either automatically or manually according to driving conditions or speed, including longer ranges for sensing objects in a heavy fog. Accordingly, combinations of the aforesaid sensors can be used as desired. If desired, a switch, or similar deactivating means, can be connected to each sensor so as to deactivate the sensor if it remains permanently activated after an accident.

The actuation switch 206 is preferably constructed with a single pair of switching contacts 218 which are normally open for controlling valve 212. On energization of a coil 220 by a sensor 202, contacts 218 are closed, thereby energizing valve 212. preferably, the switch 206 is of a time delay type so that after a predetermined period of energization, such as one to two seconds, contacts 218 re-open, thereby releasing the rearward force on the pad 102 so that the passenger can either leave the vehicle or remain in, as desired. Suitable means may be provided for extending the time delay period during multiple accident events, such as a collision from the front and then the side. Consequently, if the activating signals from several sensors overlap, the time period would be automatically extended to protect the passenger.

The valve 212 is preferably a spring return solenoid penumatic valve so that high pressure air will flow through it only during its period of energization. High pressure air is selectively transmitted from source 210 to the cylinder 208 via this valve 212. The pressure source 210 may comprise either a compressor or a replaceable, pressurized gas container.

The cylinder 208 is preferably a single acting pneumatic cylinder with rack 129a attached to one face of its piston 222. The other face of the piston is provided with a stop 224 with a diameter less than that of the interior wall of the cylinder 208 so as to provide an annular space at the rear of they cylinder 208 for high pressure air to enter. The return of the rack's de-energized position may be effected by a compression spring (not shown) and the escape of air through a reduced diameter, escape port 226. This port 226 has a reduced diameter so that, while a small amount of energizing air can escape through it during activation, it does not materially hinder the actuation of cylinder 208.

In a typical operation of the foregoing embodiment of the present invention in which the pad 102 is located in its stored position in recess R, the following events would occur. On accident impact, a sensor 202 would be acutated. This would close the circuit between the actuated sensor 202, the battery, and the switch coil 220, thereby actuating coil 220. Actuation of coil 220 would close contacts 218. the closing of contacts 218 would close the circuit between the battery, the switch 206, and valve 212, thereby actuating valve 312. The actuation of valve 212 would, in turn, communicate the cylinder 208 with the source of pressurized air 210 via conduits 227 and 228, thereby actuating the cylinder 208 and forcing the rack 129a outwardly. This movement of the rack 129a, via sleeve 126 reverses the torsion on spring 116 and increases the tension on it. The arm 106 and crossmember 104 and the pad 102 would move rearwardly from the stored position until the pad 102 contacted the passenger's torso. Since the rack's movement and consequent spring tension has just commenced, the pad 102 would contact the psssenger's torso at a relatively low force value. This would minimize impact shock from the pad 102. As the rack 129a continued its travel, the force of the pad 102 against the passenger would increase until maximum rack travel and force was reached and the passenger would be resiliently clamped in place. At a predetermined time after actuation of sensor 202, the time delay feature of switch 206 would de-activate the cylinder 208 and the rack 129a and spring tension would return to their original condition. This would return the pad 102 to its stored position.

Since the device 100 is reusable, the system 200 may be modified to permit testing of its operation by wiring a test switch 230 into the system in the same manner as a sensor. The switch 230 can be mounted on the vehicle's dashboard. When the switch 230 is closed, it would simulate an activated sensor, thereby activating the system 200. This permits the car owner to personally regularly test the effectiveness of his restraint system. The various types of sensors may be checked in accordance with their manufacturer's instructions regarding test procedure and frequence. The air cushion previously referred to, could be connected into the conduit 228 from the valve 212 to the cylinder 208, so as to be actuated contemporaneously with the cylinder 208. If desired, differential timing between the air cushion and cylinder 208 could be provided.

The fully automatic embodiment illustrated in FIGS. 1 to 10 and previously discussed may be modified to provide a restraint device 100' which is both a fully automatic device and a presettable automatic device. In this embodiment, illustrated in FIGS. 11 to 16, the previously described elements and their interrelationships remain the same except that a balancing spring 300 and a mechanical, hand clutch 302 are added and the attachment of the torsion spring 116 to the arm 120 is modified.

Figure 13:
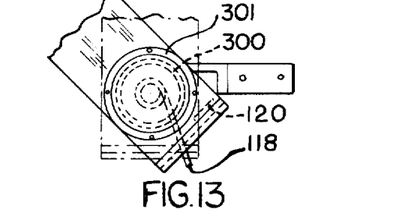
FIG. 13 is a side elevation view taken along the line 13—13 of FIG. 11.
Figure 14:
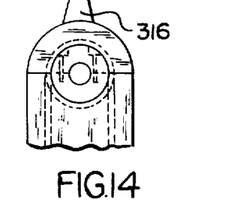
FIG. 14 is a side elevation view taken along the line 14—14 of FIG. 11.
Figure 15:
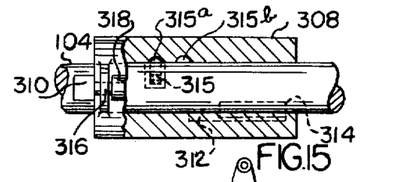
FIG. 15 is an enlarged, fragmentary top plan view, partially cut away and partially in section, illustrating an upper portion of the restraint device 100' of FIG. 11.
Figure 16:
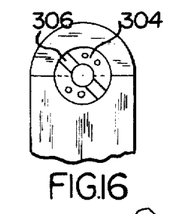
FIG. 16 is a side elevation view taken along the line 16—16 of FIG. 11.

The mechanical clutch 302 comprises a fixed plate 304 with at least one recess 306 (FIG. 16) and a movable toothed collar 308 which can be hand-operated to engage a tooth 310 within a recess 306 (FIG. 15) and lock the pad 102 in proximity with the passenger P while still permitting further movement of the pad 102 into restraining contact on actuation of the automatic system 200. The fixed plate 304 is configured to encircle the crossmember 104 and is preferably a circular plate tap-bolted to the inner boss 148. The movable collar 308 is preferably a cylindrical collar internally journaled to slide on the crossmember 104. An internal slot 312 and key 314 are provided so that the collar 308 can slide transversely on crossmember 104 yet be locked against rotation. A shock-proof, spring-loaded detent 315 and a pair of spaced recesses 315a and 315b hold the collar 308 in either the locked or unlocked position of the clutch 302. The collar 308 is preferably provided with a handle 316 and a rotatable handgrip 318 so that the passenger's hand can conveniently grasp the clutch 302 and swing it into position and lock it without shifting the hand. Sufficient clearance is provided between each tooth 310 and its corresponding recess 306 so that the pad 102 can move rearwardly in response to the automatic system 200 while being locked against forward movement in its preset position. A helical balancing spring 300 (FIGS. 11, 12 and 13) encompasses the collar 128 and outer boss 134 with one end attached to the rotatable arm 106 and the other to the pivot shaft 108 via the lock pin so as to urge the arm 106 forwardly into the recess R. Thus, the balancing spring 300 assumes one of the functions of the torsion spring 116 in urging and retaining the device 100' in recess R in the embodiment. Accordingly, the attachment of the torsion spring's end 118 to the arm 120 is modified so that the spring 116 remains unbiased when the pad 102 is manually drawn down into a preset position. This is effected by leaving the spring end 118 free of the arm 120 so that it will swing into abutment with the rear edge of the arm 120 when it is rotated into engagement with it (FIG. 13). If desired, a tap-bolted dust cover 301 may be attached to the lower end 122 of the arm 106 in encompassing relation to the spring 300, collar 128 and boss 134 to protect the spring 300.

As previously stated, this embodiment 100' has both fully automatic operation and preset automatic operation. The preset position serves the double purpose of providing a safe restraint in close proximity to the body at all times, but also allays the passenger's fear of the pad having to travel a distance of about 18 inches before contacting the body. In its fully automatic mode, the pad 102 is stored in recess R. Since the clutch 302 can't be engaged until the pad 102 is drawn down into proximity with the passenger's torso, the device 100' operates from the stored position in the same way as the embodiment 100 of FIGS. 1 to 10. In addition to its fully automatic mode, the device 100' can be preset with the pad 102 in proximity to the passenger's torso and still operate automatically. In order to provide this preset automatic mode, the passenger P grasps the handgrip 318 and draws the pad 102 rearwardly and downwardly into a predetermined position in proximity with his torso. Then, he engages the clutch tooth 310 in clutch recess 306 by sliding the movable clutch member 308 sideward and engaging the detent in the appropriate recess. This locks the pad 102 into position against forward and upward movement. The automatic operation system 200 still operates as in the fully automatic operation of the embodiment 100 of FIGS. 1 to 10, due to the enlarged clearance between tooth 310 and recess 308, except that the torsion spring end 118 will freely rotate for a slight distance until it abuttingly engages arm 120 and drives the arm 106 rearwardly. In order to release the pad 102, the passenger P disengages the clutch 302 and the balancing spring 300 returns the pad 102 to its recess R, without clutch release the pad returns to reset position. In this regard, the clutch 302 may be arranged for supplementary automatic operation by incorporating a pressurized air system including air jets similar to that disclosed in U.S. Pat. No. 3,759,343, of which this application is a continuation-in-part, for separating the clutch plate 304 from the clutch collar 308 upon the sensing of an accident event and actuation of the automatic operation system 200. Such an arrangement would result in the automatic release of the clutch and thus the pad, upon the occurrence of an accident event.

Figure 17:
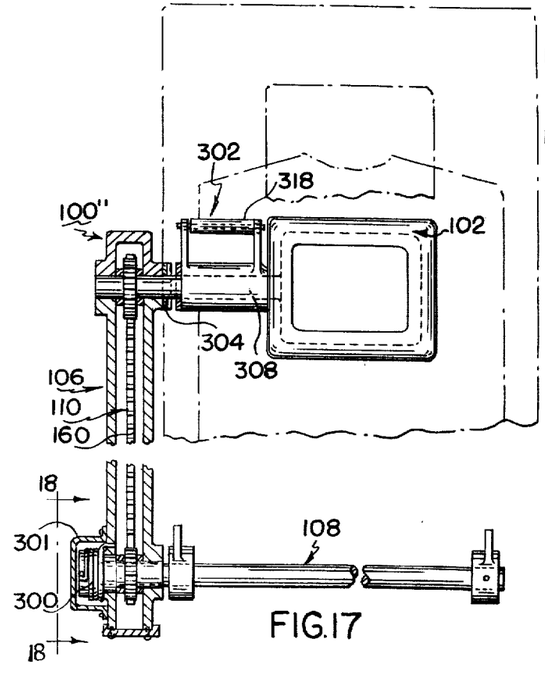
FIG. 17 is a front elevation view, partially broken and partially in section, illustrating a further modified embodiment 100" of the restraint device of FIG. 1.
Figure 18:
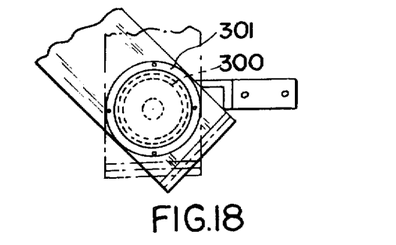
FIG. 18 is a side elevation view taken along the line 18—18 of FIG. 17.

The device of the present invention may also be modified for fully manual operation. This embodiment 100" is illustrated in FIGS. 17 and 18 and comprises the same elements and same interrelationship of elements as the previous two embodiments 100 and 100' except that the automatic operation system 200 and the torsion spring 116 and arm 120 which connect it to the arm 106 are deleted. This embodiment 100' operates in the same manner as the preset mode of the previous embodiment 100' except that there is no automatic operation.

By the foregoing arrangement of elements and their interrelationship, the restraint device of the present invention protects the vehicle occupant, especially a passenger, with an optimally sized and positioned restraint of simple construction and minimum parts. This provides reliable protection at low cost. The device is readily adapted for fully automatic operation (device 100), fully automatic operation and manually preset operation (device 100'), or fully manual operation (device 100"). The automatic operation embodiments (devices 100 and 100') provide a fully automatic, passive restraint for protecting the passenger by rapidly and automatically restraining him upon the occurrence of a vehicle accident event. The devices 100 and 100' of these embodiments are both automatic and fully reusable so that they protect for several accident events without replacement or renewal or during successive accident events, such as multiple collisions. Each of the embodiments automatically preserves the predetermined orientation of the restraining surface throughout its operating movement, if desired.

The terms and expressions which have been used are used as terma of description and not of llmitation, and there is no intention in the use of such terms and descriptions of excluding any equivalents of any of the features shown and described, or portions thereof, and it is recognized that various modifications are possible within the scope of the invention claimed.

I claim:

1. A resuable vehicle safety device adapted for restraining a vehicle occupant comprising,
   a resilient restraint pad,
   a transversely extending crossmember for supporting said pad,
   a rotatable support arm having one end operably connected to said crossmember,
   a transversely extending pivot shaft,
   said support arm having its opposite end pivotally connected to said pivot shaft for rotation of said support arm in a vertical longitudinal plane for moving said crossmember and said pad from a prepared storage position in front of and spaced from said occupant to a restraint position in contact with the torso of said occupant,
   orientation maintenance means connected to said pivot shaft and said crossmember to control rotation of said crossmember about its transversely extending axis and resulting in an angular rotation of said crossmember with respect to said support arm which is substantially equal and opposite to the angular rotation of said support arm about said pivot shaft for substantially preserving a predetermined orientation of said pad with respect to said occupant as said support arm is moved in said vertical longitudinal plane, manual means operably connected to said support arm for moving said support arm and said pad through said vertical longitudinal plane to a closer prepared position in closer proximity to the occupant's torso than when in said prepared storage position, a manually-operated clutch means releasably locking said support arm in said closer prepared position, sensing means for sensing a vehicle accident event when said restraining pad is in said prepared positions, power means connected to said support arm for moving said support arm and said restraint pad from said prepared positions into contacting engagement with said occupant, said power means including actuation means operably connected to said sensing means for actuating said power means upon the sensing of an accident event by said sensing means, and said clutch means including release means to enable said support arm to be rotated in a direction toward said occupant from said closer prepared position and preventing movement away from said occupant from said closer prepared position so that said restraint pad may be moved by said power means into contact with said occupant upon the sensing of an accident event by said sensing means while generally maintaining said predetermined orientation.

2. A safety device according to claim 1, wherein said actuation means includes a switching means for actuating said power means upon the sensing of an accident event by said sensing means.

3. A safety device in accordance with claim 2, wherein said power means includes a source of pressurized fluid, a fluid-operated cylinder and piston with a rack fixed to said piston, a control valve actuated by said switching means for selectively applying fluid to said cylinder and piston, a gear rotatably mounted on said transverse pivot shaft in driven relation to said rack, and a torsion spring disposed with one end in driving relation to said rotatable support arm and with with the other end in driven relation to said gear.

4. A safety device according to claim 2, wherein said power means comprises, a source of pressurized fluid, a fluid-operated motor operatively associated with said support arm for rotating said arm upon actuation, and a control valve actuated by said switching means for selectively applying pressurized fluid from said source to said fluid-operated motor.

5. A safety device in accordance with claim 1, wherein said restraint pad includes rearwardly projecting side walls for restraining the occupant from sidewards movement.

6. A safety device in accordance with claim 1, wherein said restraint pad disposed in closer spaced proximity from said torso includes an air cushion adapted to be inflated from a source of high pressure air, said power means also includes pressurized air means for supplying high pressure air and, said pressurized air means being connected in fluid communication with said air cushion, and said actuation means being operable for actuating said power means to supply high pressure air for inflating said air cushion upon the sensing of an accident event by said sensing means for ultra-rapidly restraining a vehicle occupant from movement, with two combined restraining forces.

7. A safety device in accordance with claim 1, wherein said clutch means includes separable clutch parts for manually positioning and releasably locking said pad in said other prepared position, and said clutch means includes pressurized air means for applying air under pressure between said clutch parts for unlocking said clutch upon the sensing of an accident event to automatically release said clutch upon the occurence of an accident event.

8. A reusable vehicle safety device adapted for restraining a vehicle occupant comprising, a resilient restraint pad, a transversely extending crossmember for supporting said pad, a rotatable support arm having one end operably connected to said crossmember a transversely extending pivot shaft, said support arm having its opposite end pivotally connected to said pivot shaft for rotation of said support arm in a vertical, longitudinal plane for moving said crossmember and said pad from a prepared storage position in front of and spaced from said occupant to a restraint position in contact with the torso of said occupant, Orientation maintenance means connected to said pivot shaft and said crossmember to control rotation of said crossmember about its transversely extending axis and resulting in an angular rotation of said crossmember with respect to said support arm which is substantially equal and opposite to the angular rotation of said support arm about said pivot shaft substantially preserving a predetermined orientation of said pad with respect to said occupant as said support arm is moved in said vertical longitudinal plane, sensing means for sensing a vehicle accident event when said restraint pad is in said prepared storage position, power means connected to said support arm for moving said support arm and restraint pad from said prepared storage position into contacting engagement with said occupant, said power means including actuation means operably connected to said sensing means for actuating said power means upon the sensing of an accident event by said sensing means, and deactuation means for deactuating said power means after a period of time to permit the return of said pad to said prepared storage position from said restraint position.

9. A safety device in accordance with claim 8, wherein said device includes time extension means for automatically extending the period of actuation of said power means upon the sensing of a plurality of successive vehicle accident events by said sensing means for protecting said occupant during the duration of the accident.

10. A safety device in accordance with claim 8, wherein said sensing means comprises an impact sensor.

11. A safety device in accordance with claim 8, wherein said sensing means comprises a distance-sensing sensor.

12. A safety device in accordance with claim 8, wherein said sensing means comprises a deceleration sensor.

13. A safety device in accordance with claim 8, wherein said restraint pad comprises
an air cushion which is disposed on the surface of said pad proximate to said occupant and which is actuable by said sensing means.

14. A reusable vehicle safety device adapted for restraining a seated vehicle occupant comprising,
a resilient restraint pad,
a transversely extending crossmember for supporting said pad,
a rotatable support arm having one end operably connected to said crossmember,
a transversely extending pivot shaft,
said support arm having its opposite end pivotally connected to said pivot shaft for rotation of said support arm in a vertical longitudinal plane between the occupant and the vehicle exterior to enable moving said crossmember and said restraint pad from prepared storage position in front of and spaced from said occupant to a restraint position in closer proximity to the torso of said occupant, and a transverse pivotal connection to said crossmember at said one end for angular rotation of said crossmember and said restraint pad with respect to said support arm,
orientation maintenance means connected to said pivot shaft and said crossmember for preserving a predetermined orientation of said pad with respect to said occupant as it moves in said vertical longitudinal plane throughout its operating movement from said prepared storage position to said restraint position,
manual means operably connected to said support arm for moving said support arm and said pad through said vertical longitudinal plane,
manually-operated clutch means releasably locking said support arm and said crossmember in said restraint position in closer proximity to said occupant to prevent angular movement of said support arm away from said occupant and angular rotation of said crossmember with respect to said support arm to maintain said pad in its optimum oriented position for contact with the occupant's torso when said support arm and said pad are in the restraint position.

15. A safety device according to claim 14, wherein
said orientation maintenance means comprises a planetary action mechanism coacting between said transverse pivot and said crossmember.

16. A safety device in accordance with claim 14, including,
spring means operably connected to said arm for urging said arm in a direction away from said occupant for moving said arm and said restraint pad from said restraint position to the prepared storage position in front of and spaced from the occupant.

17. A safety device according to claim 14, wherein
the general plane of said restraint pad is disposed in parallel relation to the general plane of the occupant's torso, and
said crossmember and said restraint pad comprise rigid and resilient parts adapted to further insure optimum orientation with said torso.

18. A safety device in accordance with claim 14, wherein
said restraint pad disposed in said closer prepared position in closer spaced proximity from said torso includes an air cushion which is automatically inflated by a source of high pressure air actuatable by a manual dashboard switch when a vehicle accident is imminent to provide contacting firm engagement of said restraint pad with the occupant.

19. A safety device in accordance with claim 18, wherein
said restraint pad disposed in said closer prepared position in closer proximity from said torso includes an air cushion which is automatically inflated by a source of high pressure air actuatable by a sensor upon sensing of an accident event to provide contacting firm engagement of said restraint pad with the occupant.

* * * * *